Patented Oct. 11, 1932

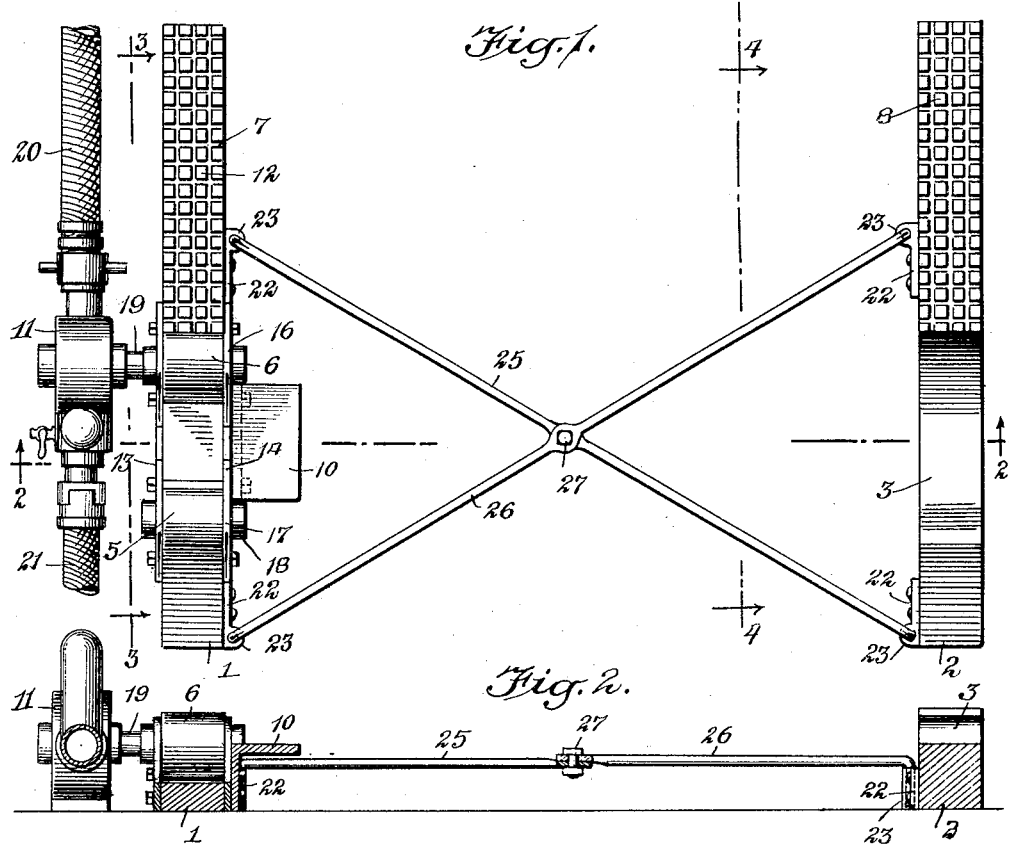

1,882,602

UNITED STATES PATENT OFFICE

NÜLO O. HOLMSTEN, OF NEW YORK, N. Y.

POWER TAKE-OFF FOR MOTOR VEHICLES

Application filed December 23, 1931. Serial No. 582,898.

This invention relates to power pumps and has for an object to provide an improved construction wherein a conventional pump may be operated from power derived from the wheel of an automobile.

Another object of the invention is to provide an improved device whereby power may be secured from one of the driving wheels of an automobile, the device being formed to receive both of the rear wheels of the automobile and to support the wheels while one operates the pump structure.

An additional object, more specifically, is to provide a pump and supporting members for the rear wheels of an automobile, together with a bracket for supporting a jack, the arrangement being such that when the jack is in use part of the weight of the automobile is carried thereby so that the wheels may produce a driving action without the full traction.

An additional object of the invention is to provide a device for receiving the rear wheels of an automobile whereby power may be received from one wheel for driving the pump, the device being formed with a jack supporting bracket and spacing members for spacing the wheel supports apart the desired distance for acting and receiving the wheels when the device is in use.

In the accompanying drawing—

Figure 1 is a top plan view of a device disclosing an embodiment of the invention.

Figure 2 is a sectional view through Figure 1 approximately on the line 2—2.

Figure 3 is a sectional view through Figure 1 approximately on the line 3—3.

Figure 4 is a sectional view through Figure 1 approximately on the line 4—4.

Referring to the accompanying drawing by numerals, 1 and 2 indicate supports or skids, the support 2 being provided with an arc-shaped depression 3, which is adapted to rather snugly receive the tire of an automobile. As illustrated in Figure 4, the tire 4 fits into the notch 3 and is held stationary thereby. As shown in Figure 3, the other rear tire 4' is resting on the rollers 5 and 6 carried by the support 1, and when the engine is running and is connected to the rear wheels, wheel 4 will remain stationary and wheel 4' will rotate, this action being permitted through the usual differential gearing of the automobile. Any of the usual types of automobiles may be used, and when the device is placed on the ground, or other support, as shown in Figure 1, the automobile is driven so that the two rear wheels will fit on the device, one fitting in the notch 3, and the other on the rollers 5 and 6. Usually, the automobile is driven to the desired point and then the device slid under the automobile in front of the rear wheels. The automobile is then driven forwardly a short distance and the rear wheels will pass up the inclined sections 7 and 8 until they assume the positions shown in dotted lines in Figures 3 and 4. Preferably, the automobile is then stopped and a jack 9 placed on the bracket 10. This jack is operated so as to take up some of the weight of the automobile so that all of the weight will not be on the rollers 5 and 6. Only a sufficient weight is allowed on these rollers to secure the desired traction and then if it is desired to operate the pump 11 the engine of the automobile is started, the same being connected in the usual manner to the rear wheels. From the drawing it will be seen that the inclined sections 7 and 8 are provided with roughened portions 12 whereby the tires may readily grip these sections and move to their place on top of the supports. The support 1 is cut out to a greater extent than the support 2, and metal plates 13 and 14 are bolted thereto by suitable bolts 15. The respective plates are provided with upstanding ears 16 and 17 through which the respective shafts 18 and 19 extend, said shafts also extending through the rollers 5 and 6. The roller 6 is rigidly secured to the shaft 19, and this shaft in turn is rigidly secured to the pump 11 in any suitable manner so as to drive this pump. This pump is preferably a rotary pump of any desired or approved type and acts in both the capacity of a suction and forced pump. In many places in the country and villages there is no provision made for a fire department. By using the present device an automobile may be driven up to or near a house, or other object on fire, and used as a fire pump for directing the water on the fire. When this is the case, the hose 20 is connected to some source of water supply, as, for instance, a well or brook, and also to intake side of the pump 11. As the device operates the pump will suck water through hose 20 and discharge the same with considerable force through hose 21. By varying the speed of the engine of the automobile the speed of the pump may be varied, and, consequently, the height of the stream of water may be varied.

In connection with the bracket 10, it will be evident that any suitable bracket may be used, but the same must be rigidly secured to the support 1 in such a way as to support the jack 9. As shown in the drawing certain of the bolts 15 also extend through part of the bracket for rigidly clamping the bracket in place. This bracket is of importance in that it provides a very desirable support for the jack. In many places the ground is soft, and, consequently, the jack would sink therein. By the use of this bracket this is avoided and the jack may be quickly placed in position and actuated to the desired extent so that it will only take a few minutes to put the entire device in operation.

In order that the supports 1 and 2 may be correctly spaced quickly to receive the rear wheels of an automobile, each support is provided with two plates 22, and each of these plates is provided with an apertured ear 23 for receiving the depending portion 24 of the respective cross bars 25 and 26. These cross bars are connected together by suitable pin or bolt 27 at the center so that when they are removed from their operative position, as shown in Figure 1, they will not become lost. Also, the bolt helps to prevent any undesirable movement when in use. Supports 1 and 2 may be made from wood or other material and are preferably made several feet long and five or six inches wide with a flat bottom so as to present an ample support for the automobile.

The pump has been described particularly as being useful for fire purposes, and while this is true, it is also very desirable as a pump for spraying, irrigation and many other purposes.

I claim:

1. A device of the character described including a pair of supports, each support having an inclined roughened section over which the rear wheels of an automobile are adapted to roll, one of said supports having an arc-shaped depression for receiving one of the wheels of said automobile, and the other of said supports having a pair of spaced rollers for receiving the other rear wheel of said automobile, and a substantially X-shaped structure removably connected with said supports for holding the supports in certain set positions in respect to each other.

2. A device of the character described including a pair of supports, one having a notch for receiving one rear wheel of an automobile, and the other a pair of rollers adapted to receive the other rear wheel of an automobile, a plurality of plates carried by each of said supports, each of said plates being formed with an apertured ear and a pair of swinging bracing members pivotally connected together centrally and positioned to present an X-shaped structure when the ends are fitted into said apertured ears, each of said bracing members having a depending section at each end adapted to fit into an apertured ear, said bracing members acting to space said supports and hold the supports in their spaced relation.

3. In a device of the character described comprising a pair of supports, each support having an inclined runway, one of said supports having an automobile wheel receiving notch and the other a pair of rollers, and a jack receiving bracket positioned adjacent one of said rollers, said bracket being adapted to receive a jack for taking up part of the weight of the automobile.

NULO O. HOLMSTEN.